UNITED STATES PATENT OFFICE.

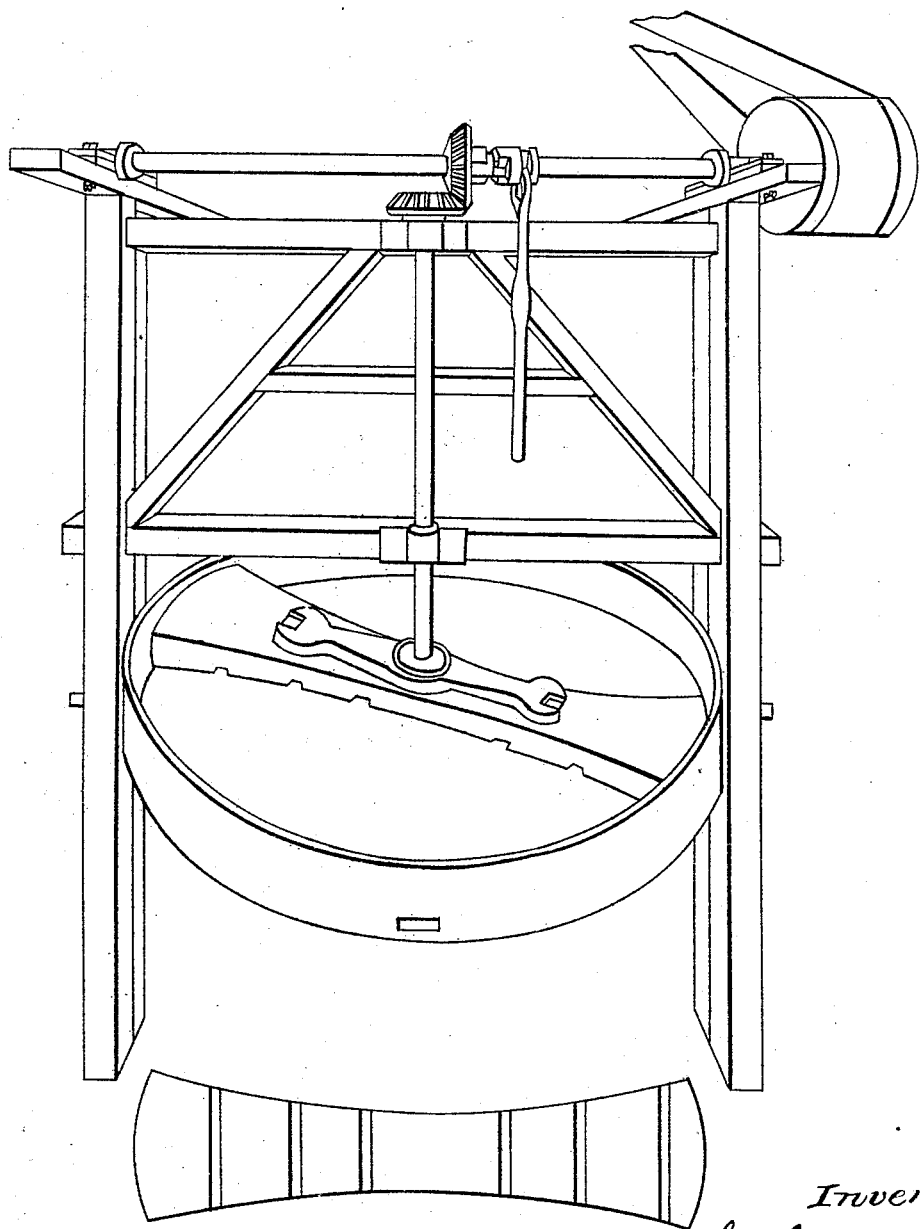

JOHN HASTINGS AND LEON P. GAUTIER, OF SAN FRANCISCO, CALIFORNIA.

IMPROVEMENT IN PROCESSES OF TREATING GOLD AND SILVER ORES.

Specification forming part of Letters Patent No. 31,598, dated March 5, 1861.

*To all whom it may concern:*

Be it known that we, JOHN HASTINGS and LEON P. GAUTIER, of the city of San Francisco, in the county of San Francisco and State of California, have discovered or invented a new and Improved Mode of Treating Silver and Gold Ores and Extracting the Silver and Gold therefrom; and we do hereby declare that the following is a full and exact description of the said method of extraction.

The ore, reduced to an impalpable powder or paste, is placed in an iron amalgamator with sufficient water to make the mass liquid. The chemical treatment is at once added. This consists of one part of commercial nitric acid mixed with three parts of muriatic acid, the aqua regia thus made being saturated with metallic copper. From one ounce to one ounce and half (liquid measure) of this compound is applied for every ounce of precious metal in the ore indicated by assay. The muller of the amalgamator is now made to revolve from fifteen to twenty times in a minute, and after three hours some of the liquid is withdrawn from the pan and tested with mercury. If it does not affect this metal the object of the treatment is attained, and the quicksilver may be added; but if it affects the mercury it must be tested again at the fourth and fifth hours. Should it still affect the mercury at this time, its action must be neutralized by lime. Forty pounds of quicksilver are now added for each pound of precious metal expected. Immediately after adding the mercury we throw in one per cent. of the quantity of ore under treatment of chloride of sodium, and half an hour after add one more per cent. of the same salt. The muller is now allowed to run at the same rate from five to eight hours longer, the time necessary being ascertained by extracting some of the mercury by an iron scoop and testing the amount of amalgamation affected by squeezing it through buckskin or close linen cloth. Generally five or six hours complete the amalgamation. When completed, the muller is stopped, the pan tilted, a stream of water let on to wash the dirt from the mercury, the plug is withdrawn, the mercury received in another vessel, and the hard amalgam is now obtained by squeezing the mercury, as above described. From this amalgam the precious metals are obtained by the usual well-known means. The amalgamators may vary in size and the amount of ore treated must vary accordingly.

The time for running the amalgamators for each batch of ore may be reduced in the following manner: The first chemical treatment may be made in advance in a box lined with sheet-copper by allowing the ore, mixed and treated as first described, to remain in the box twelve or more hours and occasionally stirring it. This method leaves the amalgamating-pan nothing but the operation of amalgamation to do, which may be finished in six hours' work, and a pan the size described will work half a ton of ore every twenty-four hours.

Our treatment of gold and silver ores differs entirely from all previously-known processes. In the Freiberg process chlorine is drawn from marine salt by a very high degree of heat. In the Mexican process the same salt yields the chlorine by long time, much labor, and through a very circuitous series of chemical reactions. In our process the chemical action requires neither this elevated degree of temperature nor a continued manipulation. Any degree of temperature between the freezing and boiling points of water is sufficient for our process, and no artificial heat is used. Our agent is very soluble in water it penetrates the whole mass and unavoidably meets every atom of metal. Marine salt is not used by us to produce chlorination of the precious metals, whereas in the old processes marine salt is a *sine qua non* for chlorination. In the old processes the consistence of the ore is pasty. In ours it must be very liquid. In those large quantities of mercury are used. In ours a small amount is sufficient. In those the mercury must be intimately mixed through the whole mass in which the precious metals are themselves disseminated. In ours the mercury remains on the bottom of the pan, for it is there that it meets with the precious metals, all of which are precipitated during the agitation of the fluid mass. The old processes use wooden barrels or stone pavement surrounded by planks. Ours requires the use of iron or copper, for the chemical agent used does not act favorably in contact with wood. Thus we have seen that the old processes begin with large quantities of marine salt used to chlorinate the metals.

We produce this chemical effect by an entirely different agent, and use but a small quantity of salt at the close of our operation to dechlorify the precious metals and fit them for amalgamation.

We have thus shown the originality of our process in the principal chemical agent employed, and in the whole mode and manner of treating silver and gold ores, and we believe and are fully convinced by repeated experiments, that our process extracts a larger percentage of precious metal than any other known process.

What we claim, and desire to secure by Letters Patent as our invention, is—

The manner of extracting gold and silver from their ores by the use, in the manner set forth, of chloride of copper, whether prepared in the manner described or by any other means.

JOHN HASTINGS.
L. P. GAUTIER.

Witnesses:
WM. F. EASTHAM,
GEO. W. INSLEE.